United States Patent [19]

Chen

[11] Patent Number: 4,816,508

[45] Date of Patent: Mar. 28, 1989

[54] STABILIZED CATIONIC ACRYLATE OR METHACRYLATE POLYMER ADMIXTURES

[75] Inventor: Shih-Ruey T. Chen, Coraopolis, Pa.

[73] Assignee: Calgon Corporation, Pittsburgh, Pa.

[21] Appl. No.: 183,024

[22] Filed: Apr. 18, 1988

Related U.S. Application Data

[63] Continuation of Ser. No. 1,059, Jan. 7, 1987, abandoned, which is a continuation-in-part of Ser. No. 795,799, Nov. 7, 1985, abandoned.

[51] Int. Cl.$^4$ ................................................. C08K 5/09
[52] U.S. Cl. .................................... 524/300; 524/321; 524/551; 524/555
[58] Field of Search ................................ 524/300, 321

[56] References Cited

U.S. PATENT DOCUMENTS

| | | | |
|---|---|---|---|
| 4,126,461 | 11/1978 | Pupo et al. ............................ | 430/402 |
| 4,194,063 | 3/1980 | Frank et al. ............................ | 435/4 |
| 4,258,715 | 3/1981 | Goble .................................... | 526/230 |
| 4,396,513 | 8/1983 | Heldeman ............................ | 210/734 |
| 4,397,322 | 8/1983 | Arbaczawski ........................ | 424/20 |

*Primary Examiner*—Joseph L. Schofer
*Assistant Examiner*—Bernard Lipman
*Attorney, Agent, or Firm*—W. C. Mitchell; M. C. Sudol, Jr.

[57] ABSTRACT

The present invention is directed to an admixture, comprising:
(A) a cationic acrylate or methacrylate polymer and
(B) 0.1 to 5.0%, by weight, based on the weight of said polymer, of an acidic buffering compound.

The present invention is also directed to a method for improving the stability of cationic acrylate polymers, comprising adding 0.1 to 5.0%, by weight, based on the weight of the polymer, of an acidic buffering compound.

3 Claims, No Drawings

STABILIZED CATIONIC ACRYLATE OR METHACRYLATE POLYMER ADMIXTURES

This is a continuation of application Ser. No. 001,059 filed Jan. 7, 1987 which is a continuation of Ser. No. 795,799 filed Nov. 7, 1985 now abandoned.

BACKGROUND OF THE INVENTION

The storage life of cationic acrylate polymers, particularly emulsions, is short due to the lack of hydrolytic stability. These polymers are also found to degrade during dilution, especially in a neutral or high pH aqueous solution. A long storage life and good hydrolytic stability is desired to maintain the product quality, i.e. activity.

It was surprisingly found that acidic buffering compounds improve the stability of these polymers.

DESCRIPTION OF THE INVENTION

The present invention is directed to an admixture, comprising:
(A) a cationic acrylate polymer and
(B) 0.1 to 5.0%, by weight, based on the weight of said polymer, of an acidic buffering compound.

The present invention is also directed to a method for improving the stability of cationic acrylate polymers, comprising adding 0.1 to 5.0%, by weight, based on the weight of the polymer, of an acidic buffering compound.

Any cationic acrylate polymer's stability is enhanced by the addition of an acidic buffering compound. The word "acrylate" is defined herein to include methacrylate. Specific examples of cationic acrylate polymers include homopolymers of methacryloyloxyethyl trimethyl ammonium methosulfate (METAMS), methacryloyloxyethyl trimethyl ammonium chloride (METAC), acryloyloxyethyl trimethyl ammonium chloride (AETAC), and copolymers of the above monomers with acrylamide. The preferred polymers are copolymers of acrylamide and 2-methacryloyloxyethyl trimethyl ammonium chloride (AM/METAC) and copolymers of acrylamide and methacryloyloxyethyl trimethyl ammonium methosulfate (AM/METAMS).

Although any cationic polymer's stability may be enhanced by the addition of the acid buffer, those having an intrinsic viscosity of at least 2.0 (MWT greater than 1,000,000) in 1.0M sodium chloride are more prone to stability problems.

Any acidic buffering compound may be used. The preferred acidic buffering compounds are carboxylic acids with a $pK_1$ of 1.19 to 3.08 and a $pK_2$ of 4.72 to 13.0. Examples include citric acid, phthalic acid, succinic acid, adipic acid, tartaric acid and malic acid. The most preferred acidic buffering compound is citric acid.

The acidic buffering agent is used in a dosage range of 0.1 to 5.0%, by weight, based on the weight of the polymer.

The stability of the polymer is enhanced in all forms, e.g. emulsion, solution, and dry.

The admixtures of the present invention may be used as dewatering and paper retention aids.

EXAMPLES 1 THROUGH 8

A set of water-in-oil emulsion copolymers of acrylamide and 2-methacryloyloxyethyl trimethyl ammonium chloride (40/60 w/w, 37.5% active) was prepared. After polymerization, a citric acid solution was slowly added in before addition of the inverting surfactant. This set of emulsions, containing differing levels of citric acid, was stored at both 50° C. and room temperature for four weeks. The polymer reduced viscosity (0.05% in 1N NaCl at 30° C.), the net cationic unit on the polymer, and the polymer performance as a sludge dewatering aid, were compared to a control. The results are shown in Table I below.

TABLE I

| Example | Citric Acid/Polymer (Wt. %) | Storage Temp. | n.05 in 1N NaCl (dl/g) Init. | 4 Wks | Net Change | Weight % cationic charge Init. | 4 Wks | Net Change | Sludge Dewatering Performance (mls H$_2$O collected at 10 sec.) 3 lb/ton | 4 lb/ton | 5 lb/ton |
|---|---|---|---|---|---|---|---|---|---|---|---|
| 1 | 0 | 50° C. | 16.7 | 13.8 | −2.9 | 60 | 51 | −9 | — | 213 | 244 |
| 2 | 1.33 | 50° C. | 17.4 | 16.9 | −0.5 | 60 | 60 | 0 | 195 | 250 | 265 |
| 3 | 1.60 | 50° C. | 15.9 | 15.0 | −0.9 | 59 | 59 | 0 | — | — | — |
| 4 | 2.13 | 50° C. | 16.9 | 15.3 | −1.6 | 61 | 59 | −2 | 185 | 260 | 270 |
| 5 | 0 | Room | 16.7 | 14.8 | −1.9 | 60 | 60 | 0 | 155 | 250 | 260 |
| 6 | 1.33 | Room | 17.4 | 16.9 | −0.5 | 60 | 60 | 0 | — | — | — |
| 7 | 1.60 | Room | 15.9 | 15.8 | −0.1 | 59 | 59 | 0 | 170 | 253 | — |
| 8 | 2.13 | Room | 16.9 | 16.4 | −0.5 | 61 | 59 | −2 | — | — | — |

EXAMPLES 9 THROUGH 11

A commercial AM/METAMS dry polymer (Calgon K-400) was blended with both 2.5% and 4.0% citric acid (anhydrous). Next, these polymer blends, as well as the original polymer, were dissolved in tap water to make a 0.1% solution. The % net cationic unit (as METAMS) on polymer was determined initially and after 24 hours. The polymers with citric acid were stable. The results are summarized in Table II.

TABLE II

| Example | Composition | Weight % cationic charge[2] Initial | 24 Hours | Net Change |
|---|---|---|---|---|
| 9 | K-400[1] | 58 | 44 | −14 |
| 10 | K-400 + 2.5% Citric Acid | 61 | 58 | −3 |
| 11 | K-400 + 4.0% Citric Acid | 61 | 61 | 0 |

[1]K-400 is a 40/60 w/w of a copolymer of acrylamide and methacryloyloxyethyl trimethyl ammonium methosulfate having an intrinsic viscosity between 5 and 10.
[2]The weight percent of cationic charge of polymer is determined by a colloid titration procedure. Polycationic (0.1% in concentration in water) is titrated by charge balance with a solution of polyvinyl sulfate, potassium salt, (PVSAK) using Toluidine Bluo-O as indicator. The PVSAK solution is standardized with poly(-dimethyl diallyl ammonium chloride). The net cationic charge is expressed as a weight percent of cationic monomer unit of polymer.

EXAMPLE 12

The emulsion polymers of Example 1 through 8 were diluted down to 0.1% concentration in three different industrial waters. The polymers with citric acid were more stable than the one without citric acid as indicated in Table III.

TABLE III

Effect of Citric Acid on Polymer Stability

| Process Water | Weight % citric acid | Weight % Cationic Charge Initial | Weight % Cationic Charge 24 hours | Net Change |
|---|---|---|---|---|
| Calgon Tap Water (pH 7.2) | 0 | 62 | 54 | −8 |
| | 0.53 | 59 | 58 | −1 |
| | 1.33 | 61 | 60 | −1 |
| | 1.60 | 60 | — | — |
| | 2.13 | 62 | — | — |
| Paper Process Water (pH 6.8) | 0 | 57 | 40 | −17 |
| | 1.33 | 60 | 59 | −1 |
| Sewage Treatment Water (pH 7.3) | 0 | 49 | — | — |
| | 1.33 | 54 | — | — |

What is claimed is:

1. A method for improving the stability of a cationic water-in-oil polymer emulsion comprising adding 0.1 to 5%, by weight, based on the weight of said polymer in said emulsion, of a carboxylic acid having a $pK_1$ of 1.9 to 3.08 and a $pK_2$ of 4.2 to 13.0 to said emulsion after polymerization and before addition of an inverting surfactant; wherein said polymer is selected from the group consisting of polymers prepared using methacryloyloxyethyl trimethyl ammonium methosulfate, methacryloyloxyethyl trimethyl ammonium chloride or acryloyloxyethyl trimethyl ammonium chloride, alone or in combination with acrylamide.

2. The method of claim 1, wherein said polycarboxylic acid is selected from the group consisting of citric acid, phthalic acid, succinic acid, adipic acid, tartaric acid and maleic acid.

3. The method of claim 2, wherein said polycarboxylic acid is citric acid.

* * * * *